Feb. 10, 1970
D. L. BANFIELD
3,494,470
REVERSE OSMOSIS APPARATUS
Filed Feb. 15, 1968
2 Sheets-Sheet 1
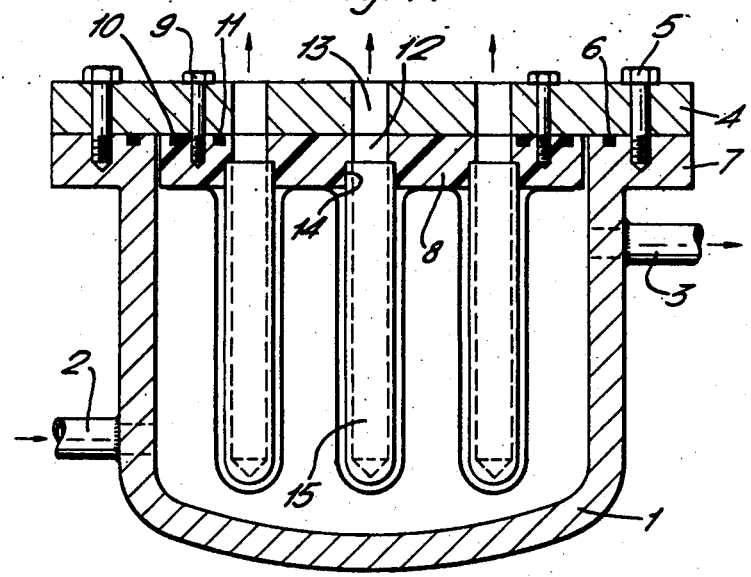
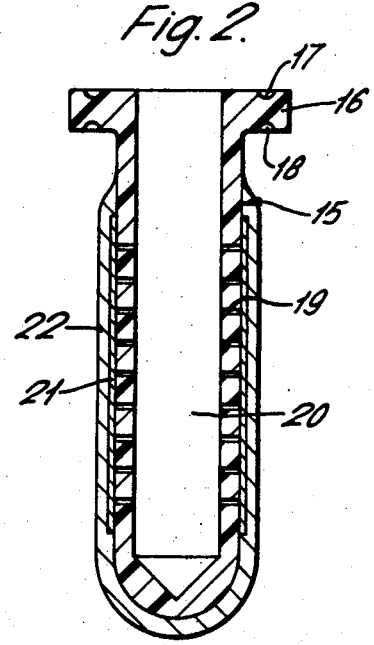

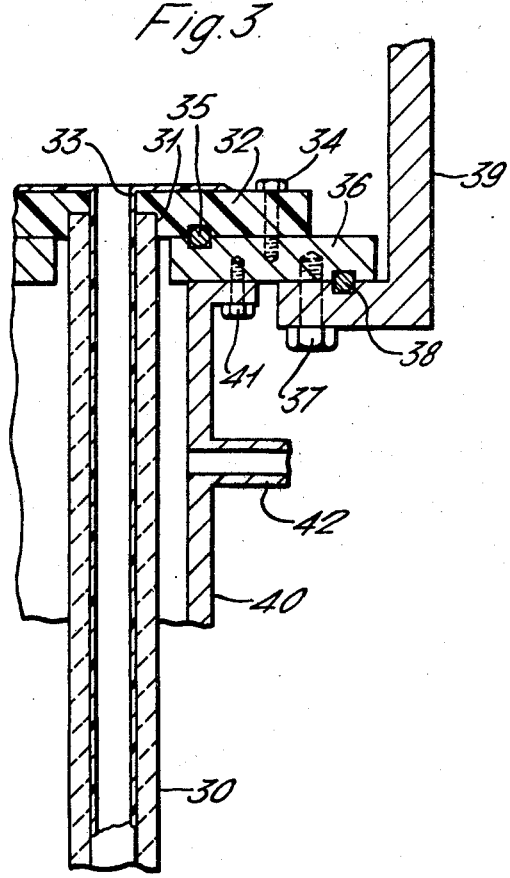

United States Patent Office 3,494,470
Patented Feb. 10, 1970

3,494,470
REVERSE OSMOSIS APPARATUS
David Leslie Banfield, Goring-on-Thames, England, assignor to United Kingdom Atomic Energy Authority, London, England
Filed Feb. 15, 1968, Ser. No. 705,723
Claims priority, application Great Britain, Feb. 22, 1967, 8,568/67
Int. Cl. B01d 25/04, 13/00
U.S. Cl. 210—321                                    6 Claims

ABSTRACT OF THE DISCLOSURE

Reverse osmosis apparatus includes a porous membrane support of elongated or tubular form and an end plate or the like with a semi-permeable membrane cast onto the membrane support and adhesively secured to a non-porous part thereof or to the end plate.

Background of the invention

The present invention relates to reverse osmosis, which is a procedure widely used for the partial or complete deionisation of solutions, for example in the purification or desalination of brackish or salt water.

The phenomenon of "osmosis" is well-known and is the diffusion of a solvent through a semi-permeable membrane into a more concentrated solution in order to equalise the pressures on both sides of the membrane. The "osmotic pressure" is that pressure which will just prevent flow through the membrane due to osmosis. In "reverse osmosis" a pressure higher than the osmotic pressure is applied to the more concentrated solution; this pressure not only opposes the flow of solvent in the direction indicated by the concentration differential, but actually causes solvent to flow from the more concentrated to the less concentrated solution. It will be apparent that as the semi-permeable membrane impedes the flow of ions to a greater or lesser extent, the technique of reverse osmosis can be used to produce a deionised solution.

The optimum pressures used for reverse osmosis may be extremely high, for example of the order of 1,500 pounds per square inch for desalinating sea water, and there is difficulty in fabricating or depositing a membrane on to a support material having the required mechanical strength and porosity to water flow in order to permit the technique to be carried out on a relatively large scale.

It is an object of the present invention to provide improved apparatus for reverse osmosis.

Summary of the invention

According to the present invention, there is provided apparatus for reverse osmosis comprising a support member with a semi-permeable membrane cast directly thereon on the side subjected to the higher pressure.

In a preferred arrangement the membrane is cast from a dope which is or contains a solvent for the material of the support member.

According to a further aspect of the present invention, there is provided apparatus for reverse osmosis comprising an elongated support member which has at least one axial bore and perforations or natural porosity communicating the bore with the surface of the member, a porous backing member covering the said perforations or natural porosity and a semi-permeable membrane covering the backing member, said semi-permeable membrane being adhesively secured to the support member at parts thereof not covered by the porous backing member.

According to yet another aspect of the present invention, there is provided apparatus for reverse osmosis comprising a plurality of porous cylindrical membrane support tubes secured between tube end support members, and a semi-permeable membrane cast directly on such tubes and end supports on the side subject to the higher pressure, the membrane being adhesively secured to the end support members.

The said adhesive securing of the semi-permeable membrane to the support member is conveniently achieved by forming the semi-permeable membrane from a dope which includes a solvent for the support member. Thus in the preferred arrangement, the support member is made of polymethyl methacrylate and the dope includes acetone which will dissolve the polymethyl methacrylate and so cause the semi-permeable membrane to be fused thereto.

In the preferred arrangement, the support member is in the form of an elongated polymethyl methacrylate tube having a rounded lower end which is sealed, so that the support member has somewhat the appearance of an elongated test tube; a portion of the cylindrical wall of this support member is perforated and above the perforated region, suitable mechanical sealing arrangements are provided for sealing the tube into a pressure chamber. In order to form the semi-permeable membrane, a permeable backing such as porous filter paper is wrapped around the perforated section of the tube and the whole arrangement is dipped into a dope solution containing acetone so that the dope spreads beyond the area of the porous paper backing and unites with the material of the support tube. After the dope has been deposited, it is treated in the usual way by drying, leaching and curing in order to impart semi-permeable characteristics.

The flow of water is arranged to be radially inward in such a construction, as will be apparent, and fresh water can be withdrawn from the axial bore of the tube. In a practical arrangement it will, of course, be apparent that a great number of such tubes are provided and are housed in a pressure vessel with their open ends communicating with a conduit for fresh water. In this way purely mechanical seals are provided between the rigid support tubes and a cover or lid for the pressure vessel and there is no need to make a mechanical seal to the semi-permeable membrane.

In the above-mentioned alternative construction the membrane is secured to tube end support members rather than, or in addition to, the membrane support tubes, the end support members being made of a suitable material for this purpose. The membrane support tubes may be made of bonded paper fibres, sintered refractory particles, sintered thermoplastic particles, or adhesively bonded particles, having continuous porosity from the external surface to the internal bore. In this arrangement, the membrane dope may be suitably pumped through the array of tubes to deposit a membrane and effect a water tight seal to the support assembly. The flow of water in this case is desirably radially outwards of the tubes.

Brief description of the drawings

In order that the invention may more readily be understood, certain embodiments of the same will now be described with reference to the accompanying drawings wherein:

FIGURE 1 shows the apparatus in diagrammatic section;

FIGURE 2 is a section, to an enlarged scale, through a single tube; and

FIGURE 3 is a diagrammatic section through a modified arrangement.

Description of the preferred embodiments

Referring now to the drawings, and in particular to FIGURE 1, it will be seen that the apparatus comprises a pressure vessel 1, having a brine inlet pipe 2 and a brine outlet pipe 3. Means (not shown) are provided for ensuring that the brine is under the correct pressure. The pressure vessel 1 is provided with a lid 4 secured thereto by a plurality of bolts 5 and an O-ring seal 6 is located between the lid 4 and an out-turned flange 7 of the vessel in order to seal the lid to the vessel. A tube plate 8 made of polymethyl methacrylate is secured to the lid 4 by means of a series of bolts 9 and is sealed thereto by means of O-ring seals 10 and 11.

The tube plate 8 is provided with a plurality of bores 12 passing therethrough, and these bores are aligned with similar bores 13 in the top plate and the bores 13 are connected to a header (not shown) for conducting away the fresh water product. The lower ends of the bore 12 are counter-bored at 14 to receive polymethyl methacrylate tubes 15, each such tube 15 being secured in its counter-bore 14 by means of an adhesive or the like.

FIGURE 2 illustrates a construction of tube which is slightly different from that shown in FIGURE 1, being designed for securement to a suitable top plate by mechanical means rather than the adhesive depicted in FIGURE 1. For this reason the tube 15 shown in FIGURE 2 is provided with an annular flange 16 at its upper end, this flange having two recesses 17 and 18 for the reception of O-ring seals.

In either embodiment, the middle portion of the wall of the tube 15 is perforated as diagrammatically indicated at 19 in order to give access to an internal bore 20 of the tube.

Wrapped around the perforated portion of the tube 15 is a porous backing member 21 which may conveniently be a length of filter paper.

In the arrangement shown in FIGURE 2, each individual tube is then lowered into a container of dope to such a level that the dope reaches above the porous backing member 21. As previously explained, this dope contains acetone which is a solvent for polymethyl methacrylate and, therefore, the dope dissolves the surface of the tube 15. The dope also contains cellulose acetate and so when the tube 15 is removed from the container of dope, it is provided with a layer 22 of cellulose acetate covering the porous backing member and firmly united to the tube above and below the backing member.

In the embodiment shown in FIGURE 1, the tube plate 8 with tubes 15 is dipped as a whole into the dope so as to provide a layer of cellulose acetate over the tube 15 and a bond between this layer and the tube plate.

The preferred composition of dope is cellulose acetate 25% by weight, formamide 30% by weight and acetone 45% by weight. Other formulations of dope such as are well-known in the art can, of course, be used.

After the layer of cellulose acetate has been applied to the tubes, it is treated by drying in air at about room temperature for one minute, leaching in cold water for about two hours followed by a five minute cure in water at 80° C., this treatment being a treatment of the type well-known for preparing a cellulose acetate membrane with salt rejecting properties.

The embodiment shown in FIGURE 3 is a development of that shown in FIGURE 1 but differs from it in two respects. In the first place instead of using closed-ended tubes, open-ended tubes are secured between a pair of tube end plates and in the second place the flow of water is radially outwardly of the tubes. Thus a plurality of tubes 30 made of a porous material such as sintered metal are secured at their ends in counter bores 31 in tube end support plates 32 made of polymethyl methacrylate. Aligned with the counter bores 31 are bores 33 which provide a smooth bore passing from the interior of the tubes 30 to above the tube plates 32. The tube plates 32 are secured by bolts 34 and sealed by O-rings 35 to backing plates 36 made of steel or the like and these backing plates 36 are in turn secured by bolts 37 and O-rings 38 to a pressure vessel 39. A relatively light sheet metal casing 40 surrounds the tubes 30 and is secured to the backing plates 36 by bolts 41. The casing 40 has a conduit 42 for the out-flow of fresh water.

In FIGURE 3 only one tube 30 is shown and only one end plate 32, but it will be appreciated that there are a pair of such end plates with a large number of tubes 30 between them.

The membrane is applied to the interior surfaces of the tubes 30 and covers at least a portion of the end plates 32, fusing to these end plates in the way previously described. It will be appreciated that the high pressure water to be desalinated is contained within the pressure vessel 39 whilst the product (at low pressure) leaves through the conduit 42 from the casing 40.

Using apparatus as above described with reference to FIGURE 1 and a membrane thickness of about 0.040″, the apparatus was tested for desalination efficiency using an artificial sea water feed. The results are shown in Table 1.

These results are comparable with results which could be expected from a flat membrane of the same thickness cast from a similar cellulose acetate dope.

TABLE 1

| Applied pressure, p.s.i. | Feed concentration, p.p.m. | P.p.m. | Salt rejection, percent | Product flow rate, g.p.d./ft.$^2$ |
| --- | --- | --- | --- | --- |
| 1,500 | 32,500 | 5,500 | 83 | 3.9 |
| 1,500 | 32,500 | 5,500 | 83 | 2.8 |
| 1,500 | 32,500 | 6,400 | 80 | 2.8 |
| 1,500 | 32,500 | 5,500 | 83 | 3.7 |

However, the invention solves the problem of sealing the edges of such a membrane and also provides a very simple and easy method of deposition of the membrane into geometries other than the flat sheet concept.

I claim:

1. Apparatus for reverse osmosis comprising an elongated support member which has at least one internal axially extending bore and fluid passageways communicating the bore with the surface of the member, a porous backing member of a material different than said support member covering the said fluid passageways and a semi-permeable membrane covering the backing member, said semi-permeable membrane being directly cast on to the backing member and support member from a dope which includes a solvent for the support member but not for the backing member, whereby the membrane is adhesively bonded directly to the support member at parts thereof not covered by the porous backing member.

2. The apparatus of claim 1, wherein the support member is made of polymethyl methacrylate and the dope includes acetone.

3. The apparatus of claim 2, wherein the support member is in the form of an elongated polymethyl methacrylate tube having a sealed lower end, a portion of the cylindrical wall of this support member having said fluid passageways and a permeable backing being located about the said portion of the tube between the tube and the membrane.

4. Apparatus for reverse osmosis comprising a plurality of porous cylindrical membrane support tubes secured between tube end support members, and a semi-permeable membrane cast directly on said tubes and said end supports on the side thereof subject to higher pressure, such semi-permeable membrane being formed from a dope which includes a solvent for the support members but not the support tubes, whereby the membrane is adhesively bonded directly to the end support members.

5. The apparatus of claim 4, wherein the support member is made of polymethyl methacrylate and the dope includes acetone.

6. The apparatus of claim 4, wherein the membrane support tubes are made of a porous material selected from the group consisting of bonded paper fibres, sintered refractory particles, sintered thermoplastic particles and adhesively bonded particles.

References Cited

UNITED STATES PATENTS 3,401,798  9/1968  Hyrop _____ 210—321

FOREIGN PATENTS 295,120  4/1965  Netherlands.

REUBEN FRIEDMAN, Primary Examiner

FRANK A. SPEAR, JR., Assistant Examiner

U.S. Cl. X.R.

210—490